Figure 1:
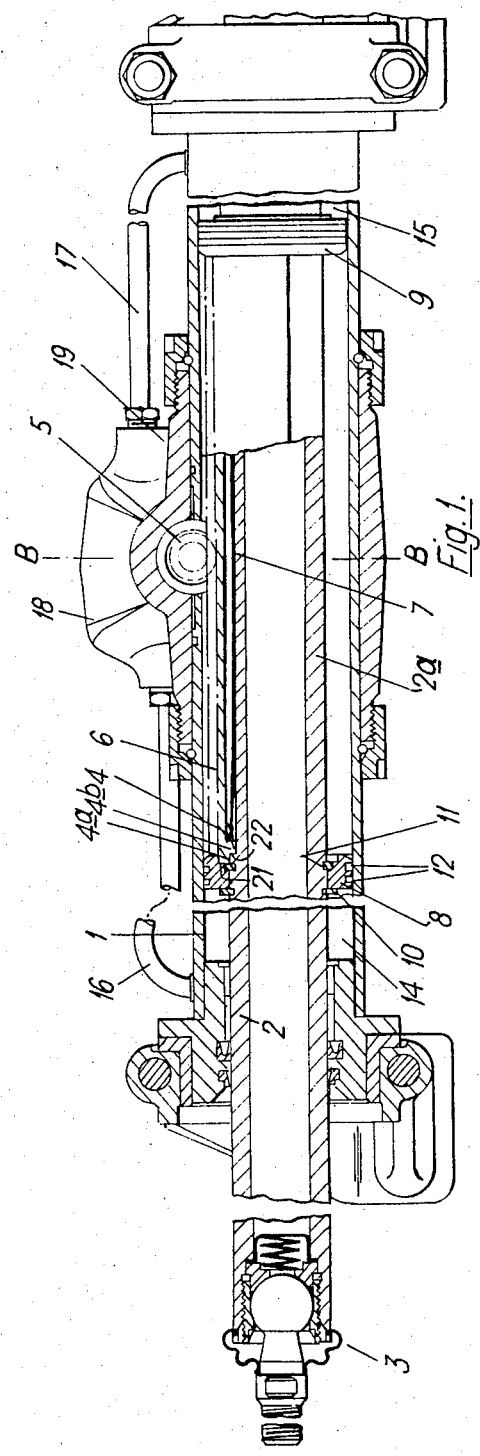

United States Patent
Rushton et al.

[11] 3,814,202
[45] June 4, 1974

[54] RACK AND PINION STEERING GEAR

[75] Inventors: Harold Rushton, Preston; Keith Blackledge, Longton, both of England

[73] Assignee: British Leyland Truck and Bus Division Limited

[22] Filed: Jan. 14, 1972

[21] Appl. No.: 217,773

[30] Foreign Application Priority Data
Jan. 20, 1971  Great Britain ..................... 2772/71

[52] U.S. Cl. ............... 180/79.2 R, 74/422, 74/498, 92/136
[51] Int. Cl. ........................................... B62d 5/10
[58] Field of Search ................. 180/79.2 R; 280/96; 92/136; 74/388 PS, 422, 498

[56]  References Cited
UNITED STATES PATENTS
3,074,735  1/1963  Ulrich ............................ 74/422 X
3,593,593  6/1971  Bradshaw ........................... 74/498
3,680,443  8/1972  Jenvey ............................. 92/136

FOREIGN PATENTS OR APPLICATIONS
735,641  8/1955  Great Britain ............... 180/79.2 R
930,320  7/1963  Great Britain ...................... 74/498

*Primary Examiner*—David Schonberg
*Assistant Examiner*—John A. Pekar
*Attorney, Agent, or Firm*—Thomas J. Greer, Jr.

[57]  ABSTRACT

In a rack and pinion steering unit the rack is formed in two parts and has a spring between the two parts so that the teeth of the rack are urged into engagement with the pinion.

13 Claims, 5 Drawing Figures

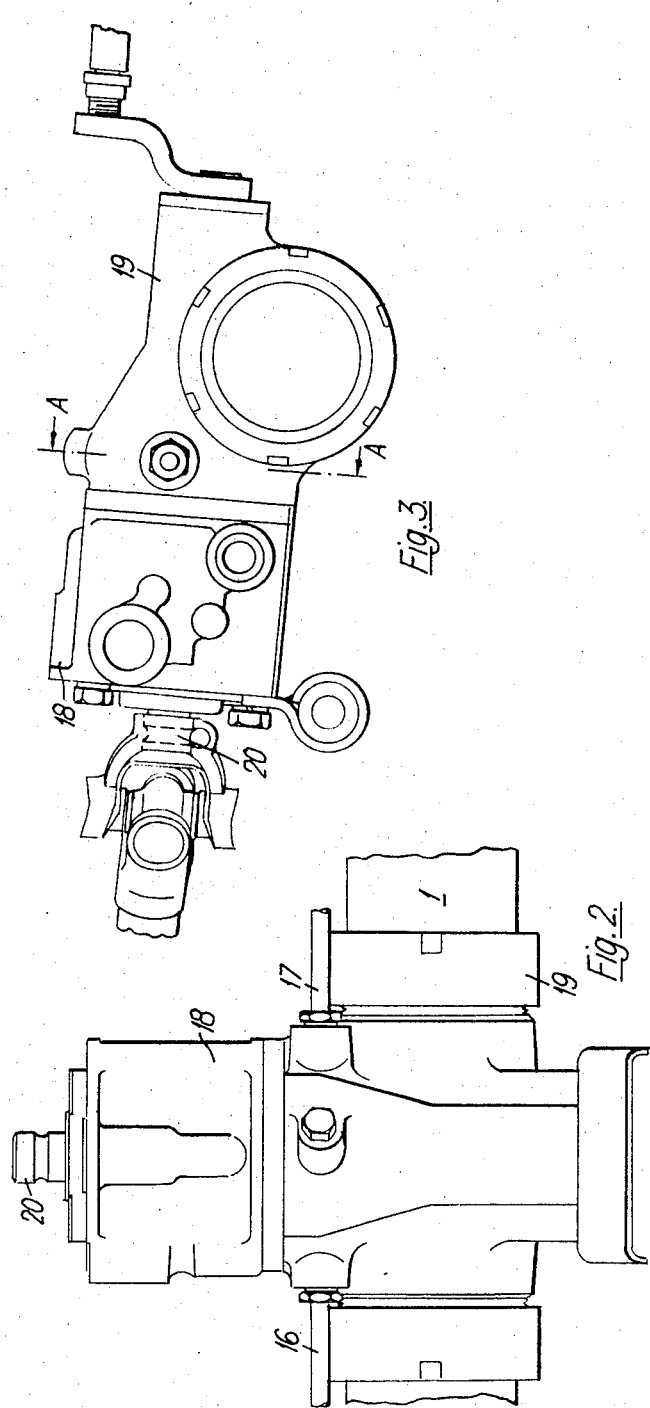

RACK AND PINION STEERING GEAR

The present invention relates to rack and pinion steering gear.

According to the present invention a rack and pinion steering unit is characterised in that:
a. the rack comprises two parts, a toothed member and a carrier member;
b. the toothed member is mounted on and is drivingly connected to the carrier member;
c. the carrier member is movable in a casing by rotation of a pinion member which meshes with the toothed member;
d. resilient means are interposed between the toothed member and the carrier member to urge the toothed member against the pinion in order to reduce the backlash between the toothed member and the pinion.

According to the present invention a rack and pinion steering unit of the kind having means for imparting power assistance to the rack is characterised in that:
a. the rack comprises two parts, a toothed member and a carrier member;
b. the toothed member is mounted on and is drivably connected to the carrier member;
c. the carrier member is movable longitudinally in a casing by rotation of a pinion in mesh with the toothed member;
d. a resilient member is interposed between the toothed member and the carrier member to urge the toothed member against the pinion in order to reduce the backlash between the toothed member and the pinion; and
e. the carrier member carries one or more pistons which divide the casing into at least two chambers into which hydraulic fluid can be introduced to urge the carrier member and hence the toothed member longitudinally of the casing.

According to a first feature of the invention the resilient member comprises a bowed leaf spring. Alternatively the resilient member could comprise a coiled spring.

According to a second feature of the invention the toothed member is of substantially part circular cross-section and sits on the carrier member in a manner analogous to a saddle.

According to a third feature of the invention the stroke of each piston is limited by an exhaust port which is associated with each piston, each exhaust port being positioned at the limit of the associated piston's travel in one direction so that pressurised fluid is exhausted from the associated chamber when the piston reaches the limit thus limiting the power stroke of the piston in that direction.

According to a fourth feature of the invention the toothed member has portions at each of its ends which engage in the respective pistons to locate the toothed member radially.

According to a fifth feature of the invention each end of the toothed member engages correspondingly shaped portions of the carrier member so that axial movement of the toothed member, by rotation of the pinion, is transmitted directly to the carrier member. The said portions may take the form of steps in the toothed member and carrier member respectively.

Figure 4:
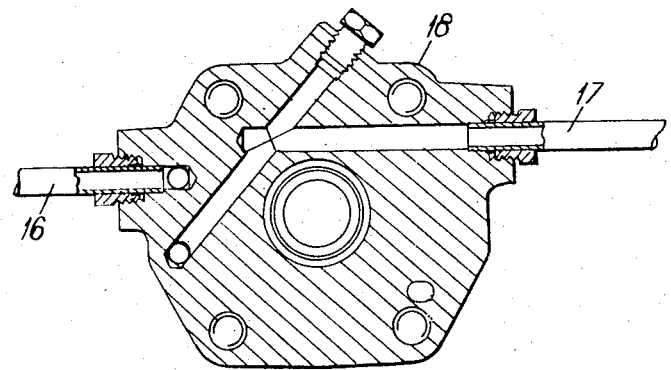
Figure 5:
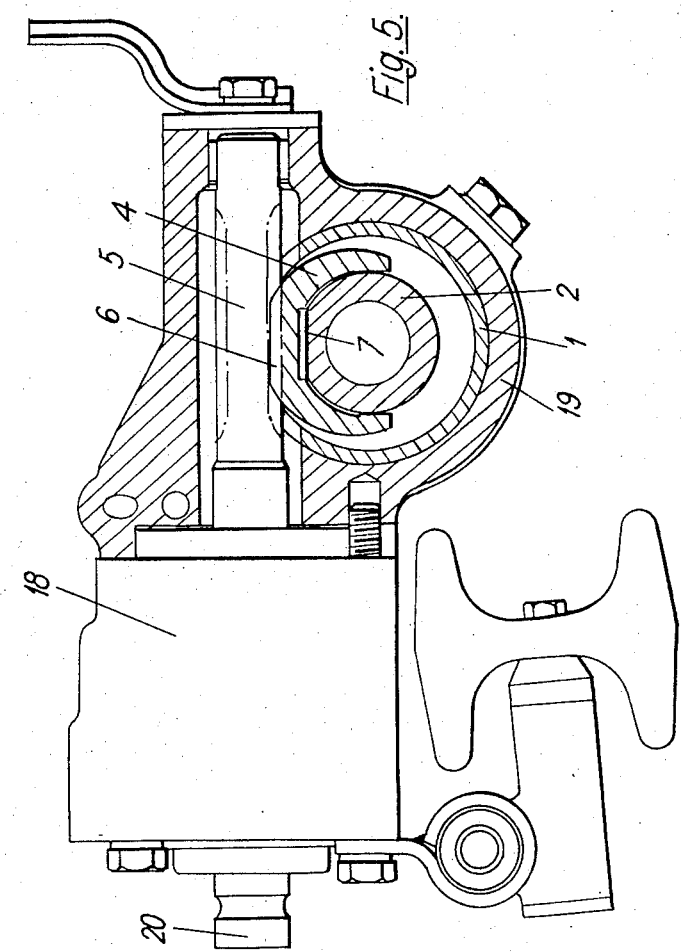

How the invention may be carried out will now be described by way of example only and with reference to the accompanying drawings in which:

FIG. 1 is a front elevational view of a unit constructed according to the present invention;
FIG. 2 is a fragmentary plan view of the unit shown in FIG. 1;
FIG. 3 is an end view of the unit shown in FIG. 1;
FIG. 4 is a sectional view taken on the line A—A in FIG. 3; and
FIG. 5 is a sectional view taken on the line B—B in FIG. 1.

A power assisted rack and pinion steering unit comprises a tubular casing 1 in which a carrier member 2 is slidable longitudinally. The carrier member 2 has an arrangement 3 on each of its ends by means of which it is adapted to be connected to the steering linkage of a vehicle.

A toothed member 4, which is generally part circular in cross-section (see FIG. 5), sits on an intermediate portion 2a of the carrier member in a manner analogous to a saddle.

A toothed pinion 5 meshes with the teeth 6 on the toothed member 4.

A bowed leaf spring 7 is interposed between the portion 2a of the carrier member and the underside of the toothed member 4 in order to urge the toothed member 4 radially outwardly against the pinion 5 and thereby reduce any backlash which might exist between the pinion 5 and the teeth 6 of the toothed member.

Two pistons 8 and 9 respectively are carried by the carrier member 2 at the ends of the portion 2a. Each piston is located by rings 10 and 11 against axial movement with respect to the carrier member 2. The outer periphery of each piston is grooved to accommodate seals 12 which bear against the inner surface of the tubular casing 1 in order to form fluid tight seals and define two chambers 14 and 15 within the casing 1.

The chambers 14 and 15 can be supplied with pressurised fluid through pipes 16 and 17 respectively which are in turn connected to a control valve 18 which is carried by a central housing 19 which encloses the middle portion of the casing 1.

In order to operate the unit a steering shaft 20 is rotated, by a steering wheel and linkage (not shown).

Rotation of the shaft 20 in turn rotates the pinion 5 and moves the toothed member 4 longitudinally in the casing 1. At the same time rotation of the shaft 20 actuates the control valve 18 and causes pressurised fluid to enter the chamber 14 or 15 depending on the direction in which the steering wheel is turned.

The pressurised fluid in the chamber 14 or 15 will then augment the mechanical force tending to move the toothed member and thus the carrier member in the casing 1.

The strokes of the pistons 8 and 9 are limited by two ports (not shown) which pass through the tube 1 and central housing 19 at a position near the centre of the casing 1 and symmetrically located at opposite sides of the pinion 5. These ports are located so that as the piston 8, for example, reaches its maximum travel in a direction to the right as viewed in FIG. 1, the associated port is brought into communication with chamber 14 to thus allow the pressurised fluid to exhaust out of the chamber 14 and thus terminate the power assistance applied to the toothed member 4.

The toothed member 4 is located in a radial direction by means of axially extending projections 4a on each end which engage in correspondingly shaped recesses 21 formed in the inner surfaces of the piston 8 and 9.

The ends of the toothed member 4 also have parts 4b which engage steps 22 formed in the carrier member 2 so that when the pinion 5 is rotated, the resulting axial movement of the toothed member 4 is transmitted directly to the carrier member 2.

Although the drawings show a leaf spring 7 for reducing the backlash between the toothed member 4 and pinion 5, a coil spring or any other resilient member, or members, could be used instead. Furthermore, although the invention has been described with reference to its application to a power assisted rack and pinion unit, it is also applicable to an unassisted or purely manual unit.

There are various advantages in forming the rack in two parts, namely the toothed member 4 and the carrier member 2. For example, as the teeth are formed in a relatively small member 4 instead of on the usual rod which extends the full length of the casing 1, machining of the teeth is facilitated. In addition the hardening of the teeth by induction heating is also easier.

We claim:

1. A rack and pinion automotive steering unit, including,
   a. a rack comprising two parts, a toothed member and a carrier member;
   b. the toothed member superposed on and drivingly connected to the carrier member, the toothed member encompassing a portion only of said carrier;
   c. a pinion and a casing;
   d. the carrier member movable in the casing by rotation of the pinion member which meshes with the toothed member;
   e. the carrier member spaced from the pinion;
   f. resilient means interposed between the toothed member and the carrier member to urge the toothed member against the pinion in order to reduce the backlash between the toothed member and the pinion.

2. The unit of claim 1 wherein said toothed member is of substantially part circular cross section.

3. The unit of claim 2 wherein the toothed member is formed wholly of metal.

4. The unit of claim 1, including,
   a. at least one piston carried by said carrier member, which divides said casing into at least two chambers into which hydraulic fluid can be introduced to urge the carrier member and hence the toothed member longitudinally of the casing;
   b. whereby power assistance may be imparted to the rack.

5. A rack and pinion steering unit as claimed in claim 4 in which:
   a. chambers are formed in the casing by means of two spaced pistons which are carried on the carrier member;
   b. each chamber having a port by which fluid can be introduced into it or exhausted from it to urge the carrier member and hence the toothed member in one longitudinal direction or the other within the casing;
   c. the stroke of each piston limited by an exhaust port which is associated with each piston, each exhaust port being positioned at the limit of the associated piston's travel in one direction so that pressurized fluid is exhausted from the associated chamber when the piston reaches the limit, thus limiting the power stroke of the piston in that direction.

6. A rack and pinion steering unit as claimed in claim 5 in which the toothed member has portions at each of its ends which engage in the respective pistons to locate the toothed member radially.

7. A rack and pinion steering unit as claimed in claim 6 in which each end of the toothed member engages correspondingly shaped portions of the carrier member so that axial movement of the toothed member, by rotation of the pinion, is transmitted directly to the carrier member.

8. A rack and pinion steering unit as claimed in claim 4 in which the resilient member comprises a bowed leaf spring.

9. A rack and pinion steering unit as claimed in claim 4 in which the resilient member comprises a coiled spring.

10. The unit of claim 1 wherein the toothed member is formed of wholly metal.

11. A rack and pinion steering unit as claimed in claim 1 in which the esilient member comprises a bowed leaf spring.

12. A rack and pinion steering unit as claimed in claim 1 in which the resilient member comprises a coiled spring.

13. A rack and pinion automotive steering unit, including,
   a. a rack comprising two parts, a toothed member and a carrier member;
   b. the toothed member superposed on and drivingly connected to the carrier member, the toothed member encompassing a portion only of said carrier;
   c. a pinion and a casing;
   d. the carrier member movable in the casing by rotation of the pinion member which meshes with the toothed member;
   e. the carrier member spaced from the pinion;
   f. resilient means for urging the toothed member against the pinion to reduce backlash therebetween.

* * * * *